: US005815716A

United States Patent [19]
Horiguchi

[11] Patent Number: 5,815,716
[45] Date of Patent: Sep. 29, 1998

[54] METHOD FOR SUPPORTING MULTIPLE CALL INTERFACE CONVENTIONS FOR COMPUTER PROGRAMS USING DIRECTIVES

[75] Inventor: Tsuneo Horiguchi, San Jose, Calif.

[73] Assignee: International Business Machines Corporation, Armonk, N.Y.

[21] Appl. No.: 539,512

[22] Filed: Oct. 6, 1995

[51] Int. Cl.$^6$ ............................................. G06F 9/45
[52] U.S. Cl. ................................ 395/705; 395/680
[58] Field of Search ................................. 395/705, 709, 395/710, 680, 683, 684, 712

[56] References Cited

U.S. PATENT DOCUMENTS

| | | | |
|---|---|---|---|
| 4,949,255 | 8/1990 | Gerth et al. ................................ | 364/200 |
| 5,218,699 | 6/1993 | Brandle et al. ........................... | 395/650 |
| 5,339,422 | 8/1994 | Brender et al. ........................... | 395/700 |
| 5,375,242 | 12/1994 | Kumar et al. ............................. | 395/700 |
| 5,539,909 | 7/1996 | Tanaka et al. ............................ | 395/700 |
| 5,581,769 | 12/1996 | Wallace et al. .......................... | 395/684 |

OTHER PUBLICATIONS

W.D. Rose, R.M. Smith, B.S. Soor, L.C. Tan and D.A. Weston, "Common Language–Independent Interface for Culturally Sensitive Functions," *IBM Technical Disclosure Bulletin*, vol. 37, No. 07, Jul. 1994.

M.J. Anderson, S.R. Ritland and J.W. Tenner, "Improved Remote Procedure Call Facility," *IBM Technical Disclosure Bulletin*, vol. 37, No. 05, May 1994.

B. Anderson, C.J. Lennon and T.N. Scaggs, "Inter–Platform Component Interface," *IBM Technical Disclosure Bulletin*, vol. 37, No. 04B Apr. 1994.

J.J. Babka, F.E. Benson and D.H. Manthei, "Interpretive Language Processor Support For OS/400 CL Command," *IBM Technical Disclosure Bulletin*, vol. 33, No. 8, Jan. 1991.

*Primary Examiner*—Emanuel Todd Voeltz
*Assistant Examiner*—Kakali Chaki
*Attorney, Agent, or Firm*—Merchant, Gould, Smith, Edell, Welter & Schmidt

[57] ABSTRACT

A method, apparatus, and article of manufacture for optimizing programming language compilers and run-time environments. More specifically, the present invention provides a computer-implemented method for supporting multiple call interface conventions for computer programs using compiler directives. Compiler directives are embedded in the source program that indicate the call interface conventions applicable to procedure calls or procedure entry points in the program, starting where a first compiler directive is included in the source program and continuing until another compiler directive of the same type indicates a new call interface convention or until the end of the source program. In addition, compiler options may be specified at compiler run-time to set the interface conventions for the procedure calls and the procedure entry points. These specifications can be overridden by the corresponding compiler directives specified within the source program.

27 Claims, 3 Drawing Sheets

METHOD FOR SUPPORTING MULTIPLE CALL INTERFACE CONVENTIONS FOR COMPUTER PROGRAMS USING DIRECTIVES

BACKGROUND OF THE INVENTION

1. Field of the Invention

The present invention relates generally to computer-implemented compilers for high-level programming languages and their associated run-time environments, and in particular, to a computer-implemented method for supporting multiple call interface conventions for computer programs using compiler directives.

2. Description of the Related Art

A compiler is a computer program that translates a source program into an equivalent object program. The source language is typically a high-level language like COBOL, and the object language is the assembly language or machine language of some computer. The translation of the source program into the object program occurs at compile time; the actual execution of the object program occurs at run-time.

A compiler must perform an analysis of the source program and then it must perform a synthesis of the object program, wherein it first decomposes the source program into its basic parts, and then builds the equivalent object program parts from the source program parts. As a source program is analyzed, information is obtained from declarations and procedural statements, such as loops and file I/O statements.

Compilers for the COBOL programming language are well known in the art. In addition, run-time environments for COBOL-based computer programs are also well known in the art. The COBOL language has evolved into a standard language for business applications on mainframes and minicomputers, and has been adopted as such by the American National Standards Institute, Inc. (ANSI).

Language standards, such as the ANSI COBOL standard, do not specify what the implementations of program (or function) call interfaces should be. Thus, it is up to the individual language compiler to decide what call convention(s) to implement. There are a number of different call interface conventions known in the art, depending on the language type, processor type, or even vendor identity. Thus, it would be helpful if compilers were "aware" of these different call interface conventions, and provided capabilities for source programs to select from among the different conventions.

Several factors must be given consideration in selecting how a call interface convention is selected among different call interface conventions. First, the compiler should allow a default specification of the call interface convention. Second, the method for specifying procedure calls or procedure entry points in the source language should not require new language syntax extensions. Third, the selection of the call interface convention should be available at various granularities to allow selection of the call interface convention for each procedure call or procedure entry point, for a section of a source program, or for the entire source program. Finally, the call interface convention should be flexible enough to allow specification of the conventions used for procedure calls and procedure entry points separately.

Although techniques have been developed for selecting call interface conventions in computer languages, such as COBOL, for personal computers and work stations, there is still a need in the art for a method which meets the above requirements. In order to meet the above requirements, the present invention provides a method for supporting multiple call interface conventions for computer program calls using compiler directives and options.

SUMMARY OF THE INVENTION

To address the requirements described above, the present invention provides a computer-implemented method for supporting multiple call interface conventions for computer program calls using compiler directives and options.

The present invention allows compiler directives to be embedded in the source program that indicate the call interface conventions applicable to procedure calls or procedure entry points in the program, starting where a first compiler directive is included in the source program and continuing until another compiler directive of the same type indicates a new call interface convention or until the end of the source program. In addition, compiler options may be specified at compiler run-time to set an entry interface convention or a call interface convention, both of which can be overridden by the directives within the source program.

An object of the present invention is to provide the capability for programming languages to use multiple call interface conventions. Another object of the present invention is to preserve a standard method of specifying call or entry statements regardless of the specific call or entry convention selected within source programs. Still another object of the present invention is to provide the capability to select a call interface convention for a single procedure call or procedure entry point, a block of a source program, or an entire source program.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and in which is shown by way of illustration embodiments of the invention. It is understood that other embodiments may be utilized and structural changes may be made without departing from the scope of the present invention.

OVERVIEW

The present invention discloses a method, apparatus, and article of manufacture for supporting multiple call interface conventions for computer program calls using compiler directives and options.

In any computer language, there is a default call interface convention that defines how procedure calls and procedure entry points are performed. The call interface convention comprises the steps that must be performed in order for a calling procedure or program to invoke or "call" a procedure and pass parameters to the called procedure. Further, the call interface convention comprises the steps that must be performed in order for a called procedure or program to access the parameters passed by the calling procedure or program, and then return parameters and control correctly to the calling procedure upon completion of called procedure. Typically, these conventions define the format of the "stack frame" or other mechanism used in performing procedure calls, passing parameters to the called procedure, and returning correctly to the calling procedure or object program.

In the present invention, a source program can specify procedure calls or procedure entry points that conform to call interface conventions other than its default interface conventions. Generally, these other procedure calls and procedure entry points have been written in other languages conforming to other call interface conventions. Nonetheless, a source program can specify and use any call interface convention that is recognized by the compiler.

In the present invention, the call interface convention for a specific procedure can be defined at any point within the source program using a compiler directive embedded in a source program. In addition, the selections can be made by compiler options for the call interface convention and the entry interface convention. Such specifications by the compiler options are applicable to the entire source program. The selections made within the source program may override the specifications made through the compiler options, which may be implemented as environment variables or switches that are specified at the run-time of the compiler. This capability allows per call granularity related to the selection of the call interface convention. As a result, the present invention makes programming languages more adaptable.

HARDWARE ENVIRONMENT

Figure 1:
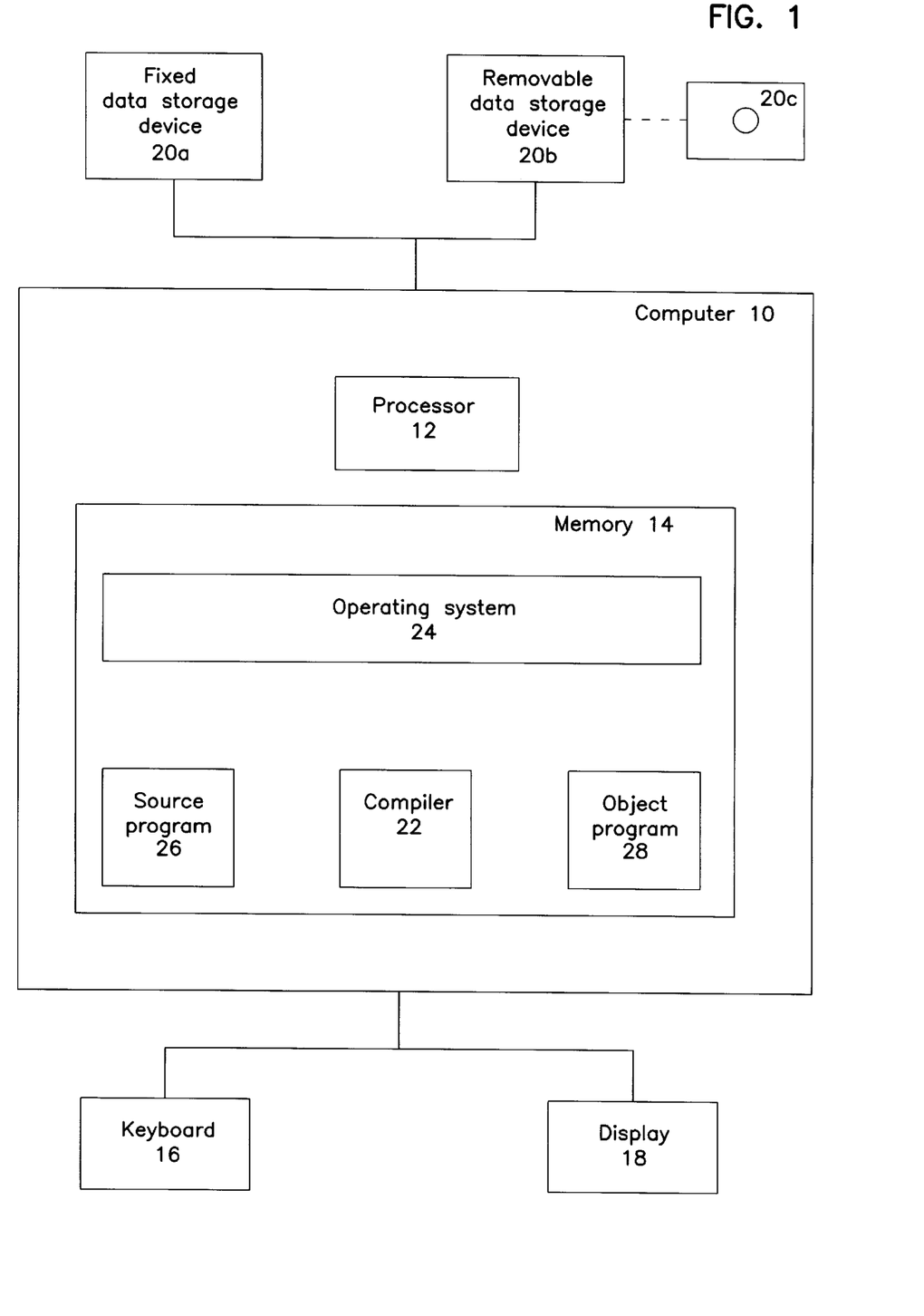
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, a computer 10 may include, inter alia, a processor 12, memory 14, keyboard 16, display 18, as well as fixed and/or removable data storage devices and their associated media 20a, 20b, and 20c. Those skilled in the art will recognize that any combination of the above components, or any number of different components, peripherals, and other devices, may be used with the computer 10.

The present invention is generally implemented using a compiler program 22 executed under the control of an operating system 24, such as OS/2™, Windows™, AIX™, UNIX™, DOS™, etc. In the preferred embodiment, the compiler 22 conforms to ANSI COBOL language conventions, although those skilled in the art will recognize that the compiler 22 could also conform to other language conventions without departing from the scope of the present invention.

The compiler 22 performs an analysis of a source program 26 containing source language statements, wherein the source program 26 is generally stored in a text file on the data storage devices 20a–c or entered interactively by a programmer from the keyboard 16. The compiler 22 then synthesizes an object program 28 from the source language statements in the source program 26.

Using extensions built into standard language conventions according to the present invention, a programmer can enter source language statements into the source program 26 that specify a particular type of call interface convention, such as the call interface conventions for performing procedure calls or procedure entry points in C, FORTRAN, PASCAL, etc. These source language extensions, when recognized by the compiler 22, result in the generation of an object program 28 containing instructions for performing procedure calls and procedure entry points according to the selection of the call interface convention.

Generally, the compiler 22, operating system 24, source program 26, and object program 28 are all tangibly embodied in a computer-readable medium, e.g., one or more of the fixed and/or removable data storage devices and their associated media 20a–c. Moreover, the compiler 22, operating system 24, and object program 28, are all comprised of instructions which, when read and executed by the computer 10, causes the computer 10 to perform the steps necessary to implement and/or use the present invention. Under control of the operating system 24, the compiler 22, and object program 28 may be loaded from the data storage device 20a–c into the memory 14 of the computer 10 for use during actual operations.

COMPILATION

Figure 2:
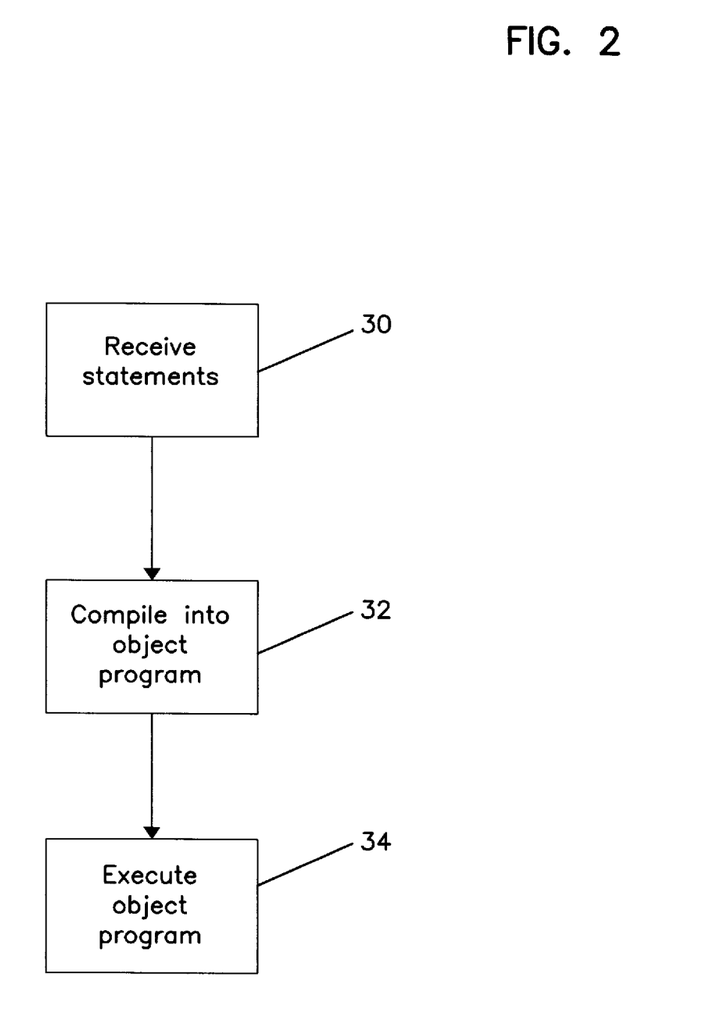
FIG. 2 is a flowchart illustrating the general logic performed during the compilation process to accomplish the present invention.

FIG. 2 is a flowchart illustrating the general flow performed for the compilation and the execution of a program to accomplish the present invention. Block 30 represents the compiler 22 receiving source language statements comprising a source program 26 into the memory 14 of the computer 10, wherein at least one of the statements comprises a selection of a call interface convention for procedure calls and/or procedure entry points. Block 32 represents the compiler 22 translating the source program 26 into an object program 28 in the memory 14 of the computer 10, wherein the object program 28 includes instructions for performing the procedure calls and/or procedure entry points according to their associated call interface conventions. Block 34 represents the object program 28 being executed in the memory 14 of the computer 10.

COMPILER DIRECTIVES FOR CALL INTERFACE CONVENTIONS

Figure 3:
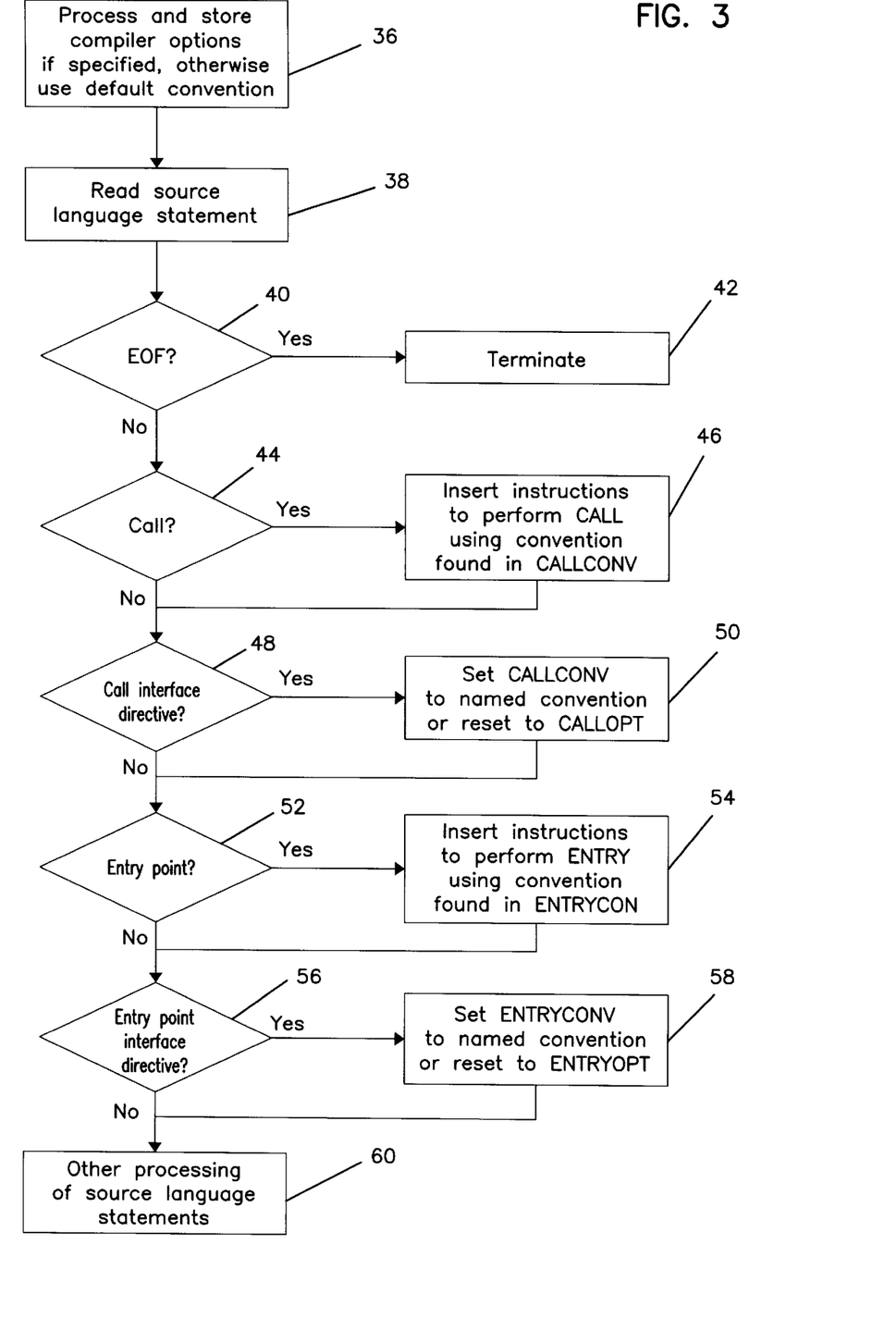
FIG. 3 is a flowchart that illustrates the logic performed during the compilation process according to the present invention.

FIG. 3 is a flowchart that illustrates the logic performed during the compilation process according to the present invention.

Block 36 represents the start of the compilation process, wherein the compiler 22 processes and stores an initial call interface convention selection in the environment variables CALLOPT (for the calling procedure convention) and ENTRYOPT (for the procedure entry point convention). As compiler options, both CALLOPT and ENTRYOPT may be specified at the run-time of the compiler 22 and are passed as parameters to the compiler 22 by the operating system 24.

Block 36 also represents the compiler 22 storing the values of the CALLOPT and ENTRYOPT compiler options into the CALLCONV and ENTRYCONV variables, respectively. The CALLCONV variable (for the calling procedure convention) and ENTRYCONV variable (for the procedure entry point convention) are used internally in the compiler 22 to store the value associated with the current call interface convention.

If the options for the CALLOPT and ENTRYOPT variables are not specified at compiler 22 run-time, then the compiler 22 stores a default call interface convention in the CALLCONV and ENTRYCONV variables as well as in the CALLOPT and ENTRYOPT variables. In the preferred embodiment, the default call interface convention comprises a value that is associated with and represents the standard system linkage convention of the computer platform.

Following block 36, block 38 represents the compiler 22 reading the first (or next) source language statement from the source program 26.

Block 40 is a decision block that represents the compiler 22 determining whether an end-of-file has occurred, indicating that the last source language statement or element has been processed. If so, the compilation process terminates at block 42. Otherwise, control transfers to block 44.

Block 44 is a decision block that represents the compiler 22 determining whether the source language statement contains a "CALL" statement. If so, then control transfers to block 46; otherwise, control transfers to block 48. Block 46 represents the compiler 22 processing the source language statement according to the current call interface convention stored in the CALLCONV variable. During this processing, the compiler 22 generates and inserts the necessary instructions into the object program 28 to perform the procedure call in the manner specified by the call interface convention. After the processing of block 46, control transfers to block 60.

Block 48 is a decision block that represents the compiler 22 determining whether the source language statement contains a ">>CALLINTERFACE" directive. If so, then control transfers to block 50; otherwise, control transfers to block 52. Block 50 represents the compiler 22 determining whether a call interface convention is specified in the directive and storing a value associated with the specified convention in the CALLCONV variable. The specification may occur through the use of a literal recognized by the compiler 22, e.g., the literal strings "C", "FORTRAN", "PASCAL", etc. If a call interface convention is not specified with the directive, then the compiler 22 stores the value from the CALLOPT variable into the CALLCONV variable. After the processing of block 50, control transfers to block 60.

Block 52 is a decision block that represents the compiler 22 determining whether the source language statement contains an "ENTRY" statement. If so, then control transfers to block 54; otherwise, control transfers to block 56. Block 54 represents the compiler 22 processing the source language statement according to current call interface convention stored in the ENTRYCONV variable. During this processing, the compiler 22 generates and inserts the necessary instructions into the object program 28 to perform the procedure entry point in the manner specified by the call interface convention. After the processing of block 54, control transfers to block 60.

Block 56 is a decision block that represents the compiler 22 determining whether the source language statement contains a ">>ENTRYINTERFACE" directive. If so, then control transfers to block 58; otherwise, control transfers to block 60. Block 58 represents the compiler 22 determining whether a call interface convention is specified in the directive and storing a value associated with the specified convention in the ENTRYCONV variable. As above, the specification may occur through the use of a literal recognized by the compiler 22, e.g., the literal strings "C", "FORTRAN", "PASCAL", etc. Similarly, if a call interface convention is not specified with the directive, then the compiler 22 stores the value from the ENTRYOPT variable into the ENTRYCONV variable. After the processing of block 58, control transfers to block 60.

Block 60 represents the compiler 22 performing any other necessary processing of the source language statement. Following the processing of block 60, control is transferred back to block 38, which represents the compiler 22 reading the next source language statement from the source program 26.

Procedure Call Example

The following is an example of source language statements that define a call interface convention as it relates to procedure calls:

```
. . .
>>CALLINTERFACE CallInterfaceConvention1
CALL PROCEDURE1 ( X )
>>CALLINTERFACE CallInterfaceConvention2
CALL PROCEDURE2 ( Y )
>>CALLINTERFACE
CALL PROCEDURE3
. . .
```

In the above statements, the ">>CALLINTERFACE" directives introduce a call interface convention, wherein "CallInterfaceConvention1" and "CallInterfaceConvention2" represent the identifier used within the source program 26 to reference or identify the particular call interface convention. Following the ">>CALLINTERFACE" directives, source language statements containing procedure calls, i.e., the "CALL" statement, will cause the compiler 22 to generate and insert the necessary instructions into the object program 28 to perform the procedure calls in the manner specified by the particular call interface convention. In the above example, the call of PROCEDURE1 will occur according to the conventions associated with CallInterfaceConvention1. Similarly, the call of PROCEDURE2 will occur according to the conventions associated with CallInterfaceConvention2. Finally, the last ">>CALLINTERFACE" directive has no specified call interface convention, and thus the procedure call of PROCEDURE3 will occur according to the call interface convention specified during run-time of the compiler 22 and stored in CALLOPT, or according to the default call interface convention if CALLOPT was not specified.

Procedure Entry Point Example

The following is an example of source language statements that define a call interface convention as it relates to procedure entry points:

```
. . .
>>ENTRYINTERFACE CallInterfaceConvention1
ENTRY: PROCEDURE1 ( X )
>>ENTRYINTERFACE CallInterfaceConvention2
ENTRY: PROCEDURE2 ( Y )
>>CALLINTERFACE
ENTRY: PROCEDURE3
. . .
```

In the above statements, the ">>ENTRYINTERFACE" directives introduce a call interface convention, wherein "CallInterfaceConvention1" and "CallInterfaceConvention2" represent the identifier used within the source program 26 to reference or identify the particular call interface convention. Following the ">>ENTRYINTERFACE" directives, source language statements containing procedure entry points, i.e., the "ENTRY" directive, will cause the compiler 22 to generate and insert the necessary instructions into the object program 28 to perform the procedure entry points in the manner specified by the particular call interface convention. In the above example, the procedure entry point of PROCEDURE1 will occur according to the conventions associated with CallInterfaceConvention1. Similarly, the procedure entry point of PROCEDURE2 will occur according to the conventions associated with CallInterfaceConvention2. Finally, the last ">>ENTRYINTERFACE" directive has no specified call interface convention, and thus the procedure entry point of PROCEDURE3 will occur according to the call interface convention specified during run-time of the compiler 22 and stored in ENTRYOPT, or according to the default call interface convention if ENTRYOPT was not specified.

CONCLUSION

This concludes the description of the preferred embodiment of the invention. The following describes some alternative embodiments for accomplishing the present invention.

For example, any type of computer, such as a mainframe, minicomputer, work station or personal computer, could be used with the present invention.

In addition, any software program which calls and/or is called by other programs, if these other programs use different call interface conventions, could benefit from the present invention.

In summary, the present invention discloses a method, apparatus, and article of manufacture for supporting multiple call interface conventions for computer program calls using compiler directives.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of programming a computer, comprising the steps of:
    (a) receiving one or more programming language statements comprising a source program into a memory of the computer, wherein at least one of the received statements comprises a selection of a call interface convention for invoking procedures, wherein the selection of the call interface convention occurs at a run-time of the compiler, and the selection of the call interface convention remains in effect for a range of the received statements; and
    (b) compiling the source program into an object program in the memory of the computer, wherein the object program includes instructions for performing separate procedure calls and entry points according to the selection of the call interface convention.

2. The method of claim 1 above, wherein the selection of the call interface convention comprises the selection of the call interface convention for procedure calls.

3. The method of claim 1 above, wherein the selection of the call interface convention comprises the selection of the call interface convention for procedure entry points.

4. The method of claim 1 above, wherein the selection of the call interface convention comprises a literal specified within the source program.

5. The method of claim 1 above, wherein the selection of the call interface convention comprises a compiler option.

6. The method of claim 1 above, wherein the range is the source program in its entirety.

7. A method of programming a computer, comprising the steps of:
    (a) receiving one or more programming language statements comprising a source program into a memory of the computer, wherein at least one of the received statements comprises a selection of a call interface convention for invoking procedures, and the selection of the call interface convention remains in effect for a range of the received statements, and the selection of the call interface convention comprises a compiler option;
    (b) specifying a value representing the call interface convention in the compiler option; and
    (c) compiling the source program into an object program in the memory of the computer, wherein the object program includes instructions for invoking procedures according to the selection of the call interface convention specified in the compiler option.

8. A method of programming a computer, comprising the steps of:
    (a) receiving one or more programming language statements comprising a source program into a memory of the computer, wherein at least one of the received statements comprises a selection of a call interface convention for invoking procedures, and the selection of the call interface convention remains in effect for a range of the received statements, and the selection of the call interface convention overrides a default call interface convention; and
    (b) compiling the source program into an object program in the memory of the computer, wherein the object program includes instructions for invoking procedures according to the selection of the call interface convention.

9. A method of programming a computer, comprising the steps of:
    (a) receiving one or more programming language statements comprising a source program into a memory of the computer, wherein at least one of the received statements comprises a selection of a first call interface convention for invoking procedures, and the selection of the first call interface convention remains in effect for a range of the received statements;
    (b) compiling the source program into an object program in the memory of the computer, wherein the object program includes instructions for invoking procedures according to the selection of the call interface convention; and
    (c) receiving one or more subsequent programming language statements into the memory of the computer following the selection of the first call interface convention, wherein at least one of the subsequent statements comprises a selection of a second call interface convention for invoking procedures, and the selection of the second call interface convention overrides the selection of the first call interface convention.

10. A computer programming apparatus, comprising:
    (a) a computer having a memory;
    (b) means, performed by the computer, for receiving one or more programming language statements comprising a source program into a memory of the computer, wherein at least one of the received statements comprises a selection of a call interface convention for invoking procedures, wherein the selection of the call interface convention occurs at a run-time of the compiler, and the selection of the call interface convention remains in effect for a range of the received statements; and
    (c) means, performed by the computer, for compiling the source program into an object program in the memory of the computer, wherein the object program includes instructions for performing separate procedure calls and entry points according to the selection of the call interface convention.

11. The apparatus of claim 10 above, wherein the selection of the call interface convention comprises the selection of the call interface convention for procedure calls.

12. The apparatus of claim 10 above, wherein the selection of the call interface convention comprises the selection of the call interface convention for procedure entry points.

13. The apparatus of claim 10 above, wherein the selection of the call interface convention comprises a literal specified within the source program.

14. The apparatus of claim 10 above, wherein the selection of the call interface convention comprises a compiler option.

15. The apparatus of claim 10 above, wherein the range is the source program in its entirety.

16. A computer programming apparatus, comprising:
(a) a computer having a memory;
(b) means, performed by the computer for receiving one or more programming language statements comprising a source program into a memory of the computer, wherein at least one of the received statements comprises a selection of a call interface convention for invoking procedures, and the selection of the call interface convention remains in effect for a range of the received statements, and the selection of the call interface convention comprises a compiler option;
(c) means, performed by the computer for specifying a value representing the call interface convention in the compiler option; and
(d) means, performed by the computer for compiling the source program into an object program in the memory of the computer, wherein the object program includes instructions for invoking procedures according to the selection of the call interface convention specified in the compiler option.

17. A computer programming apparatus, comprising:
(a) a computer having a memory;
(b) means performed by the computer for receiving one or more programming language statements comprising a source program into a memory of the computer, wherein at least one of the received statements comprises a selection of a call interface convention for invoking procedures, and the selection of the call interface convention remains in effect for a range of the received statements, and the selection of the call interface convention overrides a default call interface convention; and
(c) means performed by the computer for compiling the source program into an object program in the memory of the computer, wherein the object program includes instructions for invoking procedures according to the selection of the call interface convention.

18. A computer programming apparatus, comprising:
(a) a computer having a memory;
(b) means performed by the computer for receiving one or more programming language statements comprising a source program into a memory of the computer, wherein at least one of the received statements comprises a selection of a first call interface convention for invoking procedures, and the selection of the first call interface convention remains in effect for a range of the received statements;
(c) means performed by the computer for compiling the source program into an object program in the memory of the computer, wherein the object program includes instructions for invoking procedures according to the selection of the call interface convention; and
(d) means performed by the computer for receiving one or more subsequent programming language statements into the memory of the computer following the selection of the first call interface convention, wherein at least one of the subsequent statements comprises a selection of a second call interface convention for invoking procedures, and the selection of the second call interface convention overrides the selection of the first call interface convention.

19. An article of manufacture for use in programming a computer, the article of manufacture comprising a computer-readable storage medium having a computer program embodied therein that causes the computer to perform the steps of:
(a) receiving one or more programming language statements comprising a source program into a memory of the computer, wherein at least one of the received statements comprises a selection of a call interface convention for invoking procedures, wherein the selection of the call interface convention occurs at a run-time of the compiler, and the selection of the call interface convention remains in effect for a range of the received statements; and
(b) compiling the source program into an object program in the memory of the computer, wherein the object program includes instructions for performing separate procedure calls and entry points according to the selection of the call interface convention.

20. The article of manufacture of claim 19 above, wherein the selection of the call interface convention comprises the selection of the call interface convention for procedure calls.

21. The article of manufacture of claim 19 above, wherein the selection of the call interface convention comprises the selection of the call interface convention for procedure entry points.

22. The article of manufacture of claim 19 above, wherein the selection of the call interface convention comprises a literal specified within the source program.

23. The article of manufacture of claim 19 above, wherein the selection of the call interface convention comprises a compiler option.

24. The article of manufacture of claim 19 above, wherein the range is the source program in its entirety.

25. An article of manufacture for use in propramming a computer, the article of manufacture comprising a computer-readable storage medium having a computer program embodied therein that causes the computer to perform the steps of:
(a) receiving one or more programming language statements comprising a source program into a memory of the computer, wherein at least one of the received statements comprises a selection of a call interface convention for invoking procedures, and the selection of the call interface convention remains in effect for a range of the received statements, and the selection of the call interface convention comprises a compiler option;
(b) specifying a value representing the call interface convention in the compiler option value; and
(c) compiling the source program into an object program in the memory of the computer, wherein the object program includes instructions for invoking the procedures according to the selection of the call interface convention specified in the compiler option.

26. An article of manufacture for use in programming a computer, the article of manufacture comprising a computer-readable storage medium having a computer program embodied therein that causes the computer to perform the steps of:
  (a) receiving one or more programming language statements comprising a source program into a memory of the computer, wherein at least one of the received statements comprises a selection of a call interface convention for invoking procedures, and the selection of the call interface convention remains in effect for a range of the received statements, wherein the selection of the call interface convention overrides a default call interface convention; and
  (b) compiling the source program into an object program in the memory of the computer, wherein the object program includes instructions for invoking procedures according to the selection of the call interface convention, wherein the selection of the call interface convention overrides a default call interface convention.

27. An article of manufacture for use in programming a computer, the article of manufacture comprising a computer-readable storage medium having a computer program embodied therein that causes the computer to perform the steps of:
  (a) receiving one or more programming language statements comprising a source program into a memory of the computer, wherein at least one of the received statements comprises a selection of a first call interface convention for invoking procedures, and the selection of the first call interface convention remains in effect for a range of the received statements;
  (b) compiling the source program into an object program in the memory of the computer, wherein the object program includes instructions for invoking procedures according to the selection of the call interface convention; and
  (c) receiving one or more subsequent programming language statements into the memory of the computer following the selection of the first call interface convention, wherein at least one of the subsequent statements comprises a selection of a second call interface convention for invoking procedures, and the selection of the second call interface convention overrides the selection of the first call interface convention.

* * * * *

UNITED STATES PATENT AND TRADEMARK OFFICE
CERTIFICATE OF CORRECTION

PATENT NO. : 5,815,716

DATED : September 29, 1998

INVENTOR(S) : Tsuneo Horiguchi

It is certified that error appears in the above-identified patent and that said Letters Patent is hereby corrected as shown below:

Column 1, line 42, "convention" should read --convention(s)--.

Column 1, line 43, strike "(s)".

Signed and Sealed this

Sixth Day of July, 1999

*Attest:*

Q. TODD DICKINSON

*Attesting Officer*   Acting Commissioner of Patents and Trademarks